(12) United States Patent
Li et al.

(10) Patent No.: US 11,308,066 B1
(45) Date of Patent: Apr. 19, 2022

(54) OPTIMIZED DATABASE PARTITIONING

(71) Applicant: INTERNATIONAL BUSINESS MACHINES CORPORATION, Armonk, NY (US)

(72) Inventors: Shuo Li, Beijing (CN); Xiaobo Wang, Beijing (CN); Hong Mei Zhang, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/249,232

(22) Filed: Feb. 24, 2021

(51) Int. Cl.
*G06F 16/22* (2019.01)
*G06F 16/2455* (2019.01)
*G06F 11/34* (2006.01)
*G06F 16/21* (2019.01)

(52) U.S. Cl.
CPC ...... *G06F 16/2282* (2019.01); *G06F 11/3433* (2013.01); *G06F 16/21* (2019.01); *G06F 16/221* (2019.01); *G06F 16/24557* (2019.01)

(58) Field of Classification Search
CPC .................................................. G06F 16/2282
USPC ........................................................ 707/781
See application file for complete search history.

(56) References Cited

U.S. PATENT DOCUMENTS

| 9,286,001 | B2 | 3/2016 | Skjolsvold |
| 9,996,572 | B2 | 6/2018 | Calder |
| 2015/0186490 | A1 | 7/2015 | Denuit |
| 2016/0092541 | A1 | 3/2016 | Liu |
| 2017/0337245 | A1* | 11/2017 | Beier .................. G06F 16/2433 |
| 2021/0216517 | A1* | 7/2021 | Graefe ................ G06F 16/2246 |
| 2021/0349901 | A1* | 11/2021 | Potharaju ............ G06F 16/2272 |

OTHER PUBLICATIONS

Mell, Peter et al.; "The NIST Definition of Cloud Computing;" National Institute of Standards and Technology; Special Publication 800-145; Sep. 2011; 7 pages.

* cited by examiner

*Primary Examiner* — Syling Yen
(74) *Attorney, Agent, or Firm* — Schmeiser, Olsen & Watts; Stephanie Carusillo

(57) ABSTRACT

A database-management system (DBMS) dynamically adjusts the logical and physical partitioning of data stored in database tables. An artificially intelligent DBMS partition manager draws expert inferences from the DBMS's current workload, execution logs, and data statistics, in order to identify ranges of database key values that are frequently accessed by incoming queries. The ranges are allocated to logical partitions that are then mapped to physical partitions, such that database records identified by a pair of subranges are stored in proximate areas of physical storage. This partitioning reduces the number of physical-storage accesses by populating each physical partition with records likely to be accessed together. The partition manager splits and merges the logical and physical partitions to ensure that the size of each partition falls within a predetermined range and continues to update the physical partitioning in a similar manner by drawing additional inferences from subsequent DBMS workloads, logs, and statistics.

20 Claims, 8 Drawing Sheets

PRIOR ART

OPTIMIZED DATABASE PARTITIONING

BACKGROUND

The present invention relates in general to database management system (DBMS) technology and in particular to DBMS storage-management components that determine how to logically organize and physically store data contained in the columns of database tables.

Most DBMSs divide the records stored in a database table into logical and physical partitions. This division attempts to increase the efficiency of database search and retrieval tasks by reducing the number of records through which a DBMS must search when attempting to access a particular data item.

In one example, a database table contains 10,000 records, and a "Count" column of the table stores numeric values ranging from 000 through 999. The DBMS stores the records in two physical partitions, such as files of a hard drive. One physical partition contains the 5,000 records that store numeric values 000-660 in the Count column and the other contains 5,000 records that store Count values greater than 660. In this way, when a query or other type of data-access request tries to access records that contain a particular Count value, the DBMS need search only half as many records.

Because most database tables are frequently updated, the relative sizes of these physical partitions can become unbalanced. In the preceding example, if 4,000 records that each contain a Count value between 700 and 750 are added to the table, then the second physical partition would become much larger than the first. Queries that request access to Count values greater than 660 would thus require many more data-retrieval operations than would queries that request access to lower Count values. Some DBMSs incorporate maintenance procedures that use relatively simple or static rules to periodically rebalance table partitions.

SUMMARY

Embodiments of the present invention comprise systems, methods, and computer program products for an improved database-management system (DBMS) that improves the efficiency of query-processing tasks by dynamically adjusting the logical and physical partitioning of data stored in database tables. An artificially intelligent partition-manager component of the DBMS uses artificial intelligence, machine-learning, or other cognitive technologies to draw expert inferences from the DBMS's current workload, past execution logs, and database data statistics These inferences allow the partition manager to select ranges of database key or index values that are frequently accessed by incoming queries. Each range is allocated to a logical partition and the records in the range pointed to by each logical partition are stored in physical partitions. Database records identified by a pair of key ranges accessed by the same query are stored in proximate areas of physical storage, such as in the same physical partition. This partitioning reduces the number of physical-storage accesses by populating each physical partition with records most likely to be accessed together. The partition manager splits and merges the physical partitions to ensure that the size of each partition falls, and remains, within an optimal range, and continues to update the physical partitioning in a similar manner by drawing additional inferences from subsequent DBMS workloads, logs, and statistics.

DETAILED DESCRIPTION

Figure 1:
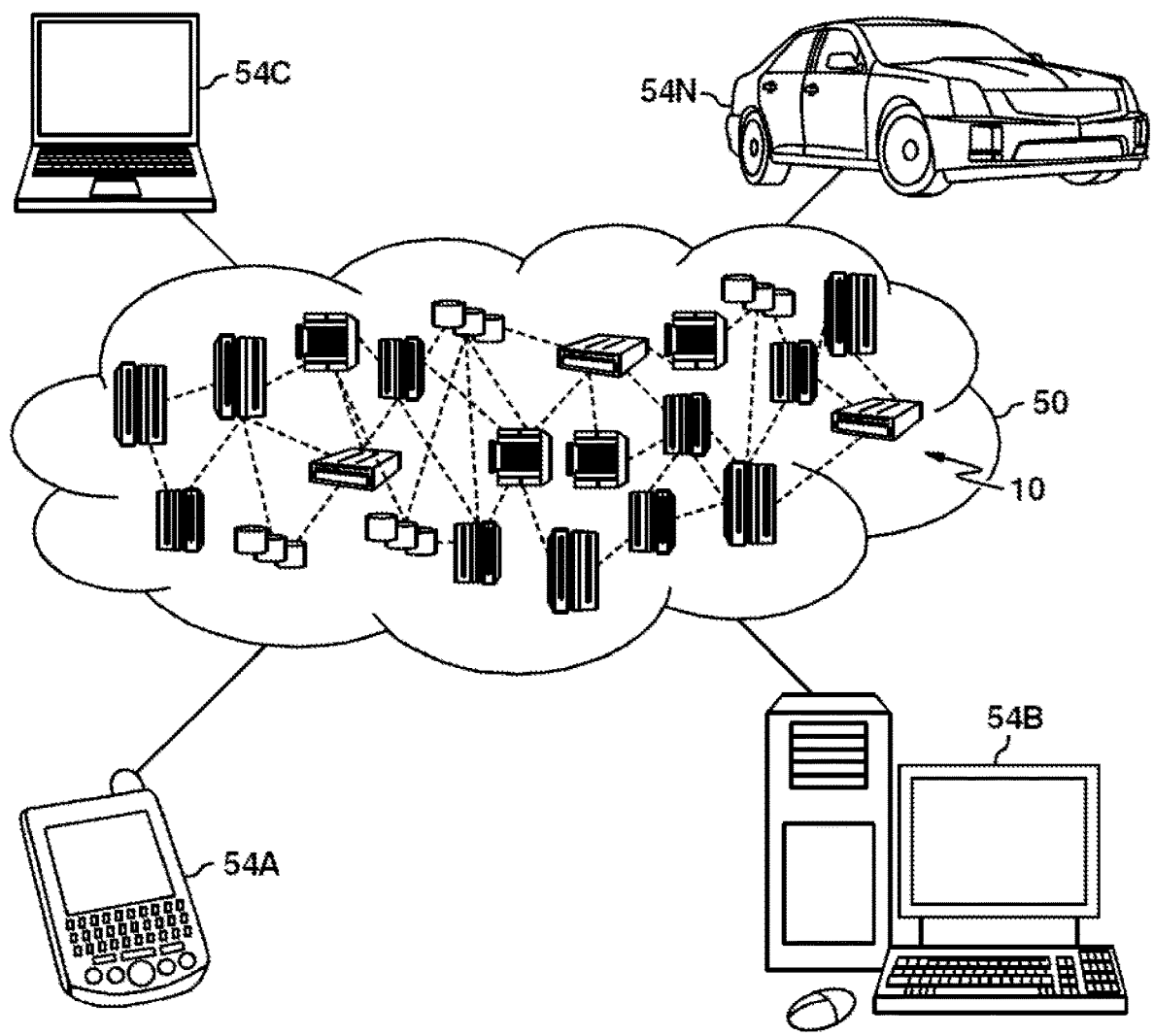
FIG. 1 depicts a cloud computing environment according to an embodiment of the present invention.

Embodiments of the present invention improve current DBMS technology by providing a more effective way for a database system to dynamically manage the organization of records in physical and logical partitions. This improved organization improves the efficiency of data-access operations by reducing the number of records that must be scanned or retrieved from physical storage when servicing a query or other type of database-access request.

In some embodiments, these improvements are implemented by adding a novel partition-management module to a conventional DBMS architecture. In other embodiments, similar functionality may be integrated into a conventional DBMS's existing components or into extrinsic software applications or computer systems.

Regardless of deployment details, embodiments automatically generate and self-optimize the DBMS's partitioning schema by using a mixed-partition mechanism to improve DBMS performance. This mechanism comprises:

i) identifying, as a function of inferences drawn from the DBMS's current workload, execution log, and database data statistics, logical predicates (or logical "conditions") that each identify a distinct, contiguous subset of the data values that can be stored in a corresponding column of a database table. The data values identified these predicates are organized into pairs, and two predicates are allocated to the same pair when a single data-access request submitted to the DBMS has requested the respective data values identified by both of the predicates;

ii) associating the pairs of conditions to a set of logical partitions, such that each logical partition identifies database records likely to be accessed together by a submitted DBMS query;

iii) mapping the records identified by each logical partition onto physical partitions, such that each physical partition physically stores records that are likely to be requested by the same data-access request; and iv) continuing over time to draw inferences from subsequent DBMS workloads, execution logs, and database data statistics, and then using those inferences to dynamically optimize the structures of the logical and physical partitions. In particular, embodiments continue over time to split and combine the physical partitions when detecting that any physical partition has become too large or too small.

In this manner, embodiments of the present invention efficiently store database records in a manner that reduces the number of physical-storage access operations needed to service incoming DBMS queries and other types of database-access requests.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
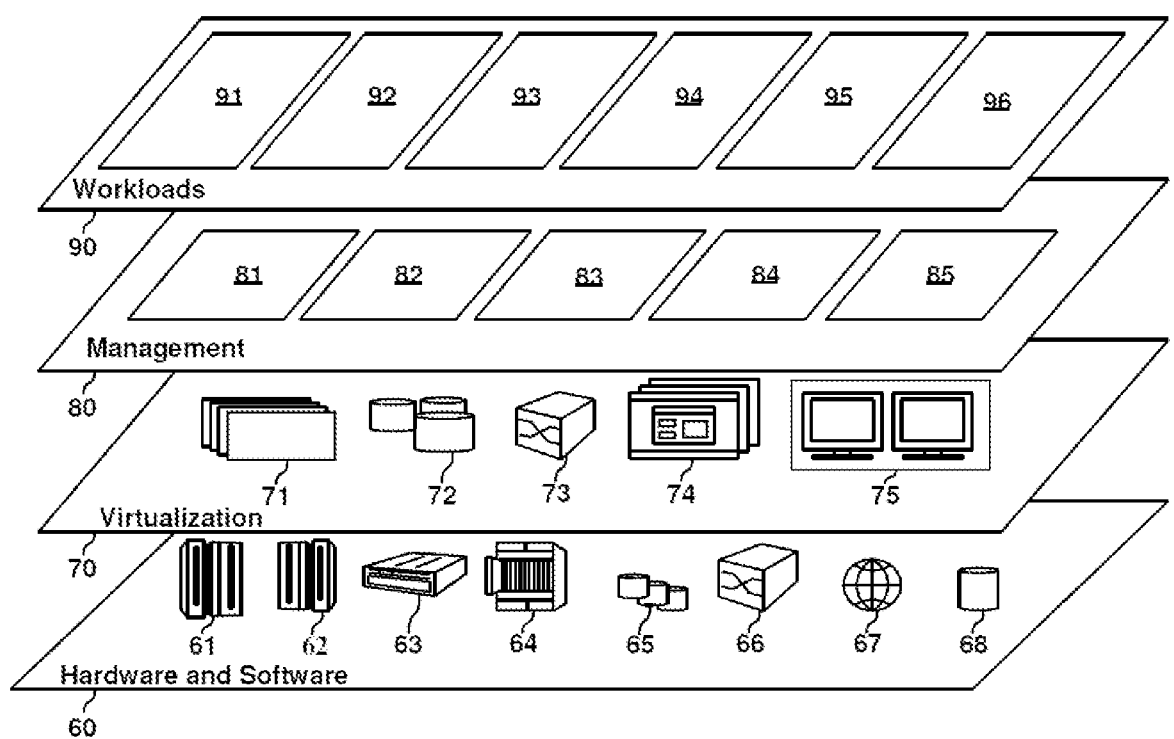
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex tasks related to optimized database partitioning 96.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
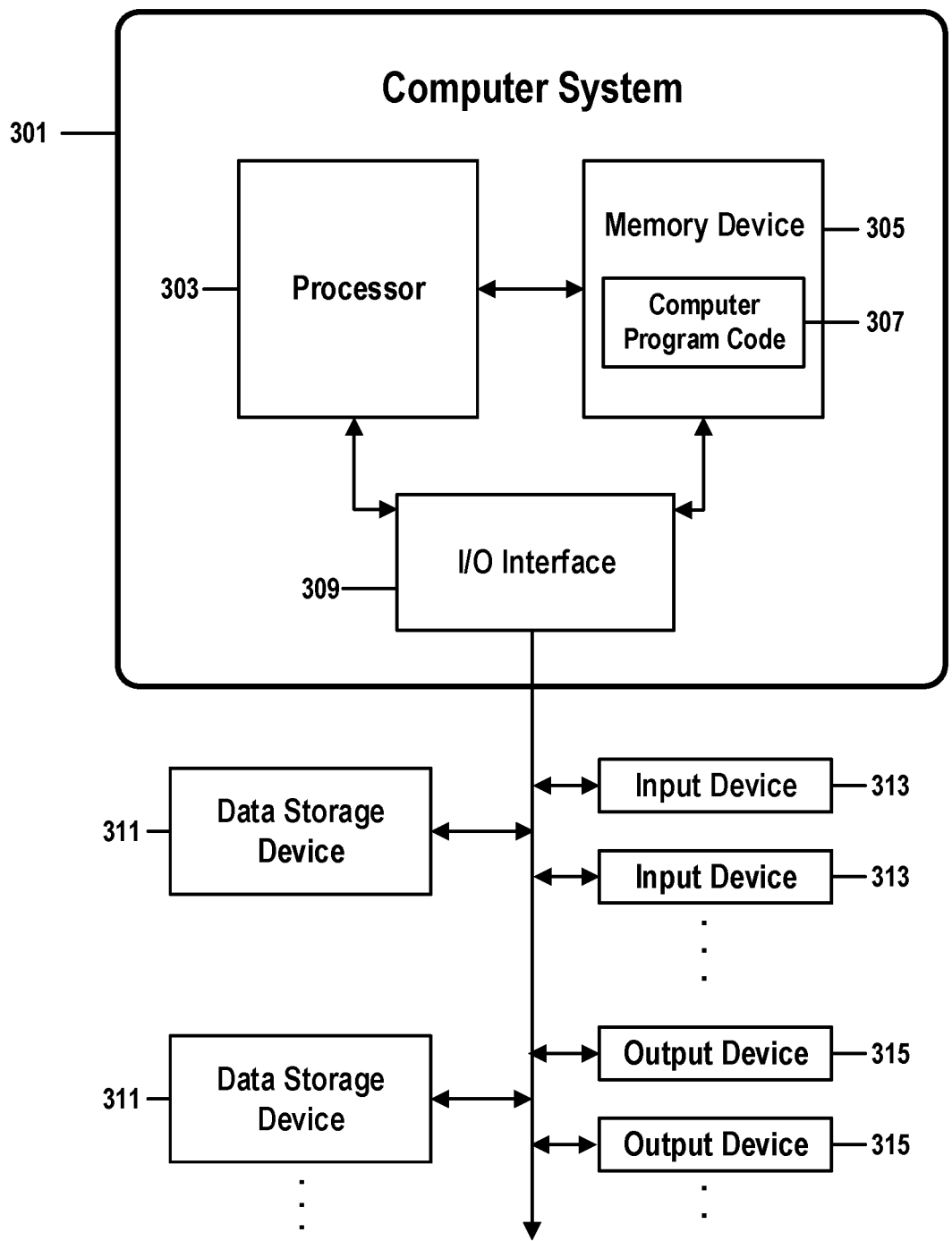
FIG. 3 shows the structure of a computer system and computer program code that may be used to implement a method for optimized database partitioning in accordance with embodiments of the present invention.

FIG. 3 shows a structure of a computer system and computer program code that may be used to implement a method for optimized database partitioning in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for optimized database partitioning in accordance with embodiments of the present invention, and may implement other embodiments described in this specification, including the methods illustrated in FIGS. 1-8. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for optimized database partitioning.

Any of the components of the present invention could be created, integrated, hosted, maintained, deployed, managed, serviced, supported, etc. by a service provider who offers to facilitate a method for optimized database partitioning. Thus the present invention discloses a process for deploying or integrating computing infrastructure, comprising integrating computer-readable code into the computer system 301, wherein the code in combination with the computer system 301 is capable of performing a method for optimized database partitioning.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for optimized database partitioning may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for optimized database partitioning is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4A:
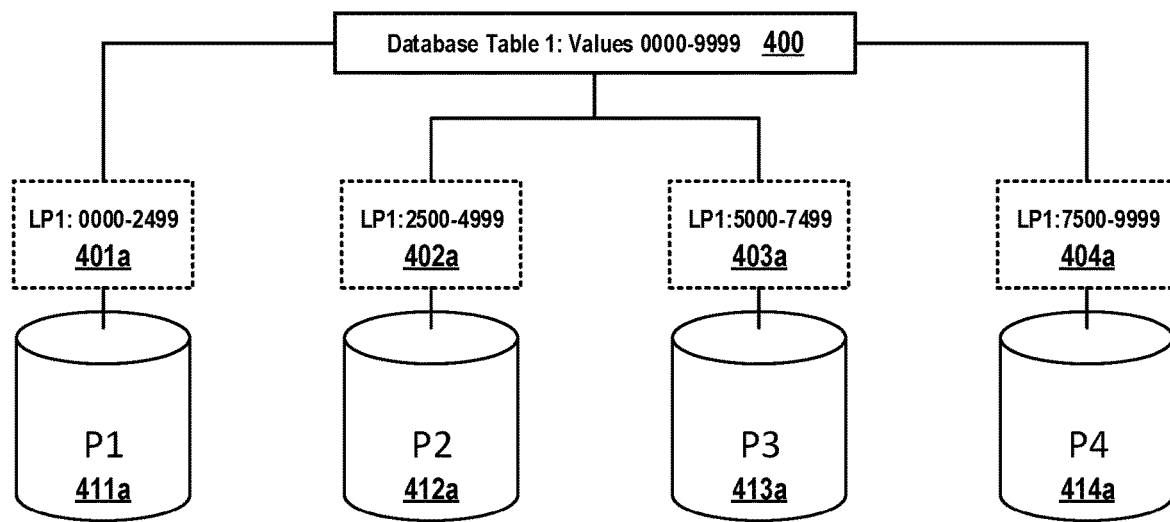
FIGS. 4A and 4B illustrate the partition-balancing problem inherent in current DBMS technology that is addressed by embodiments of the present invention.
Figure 4B:
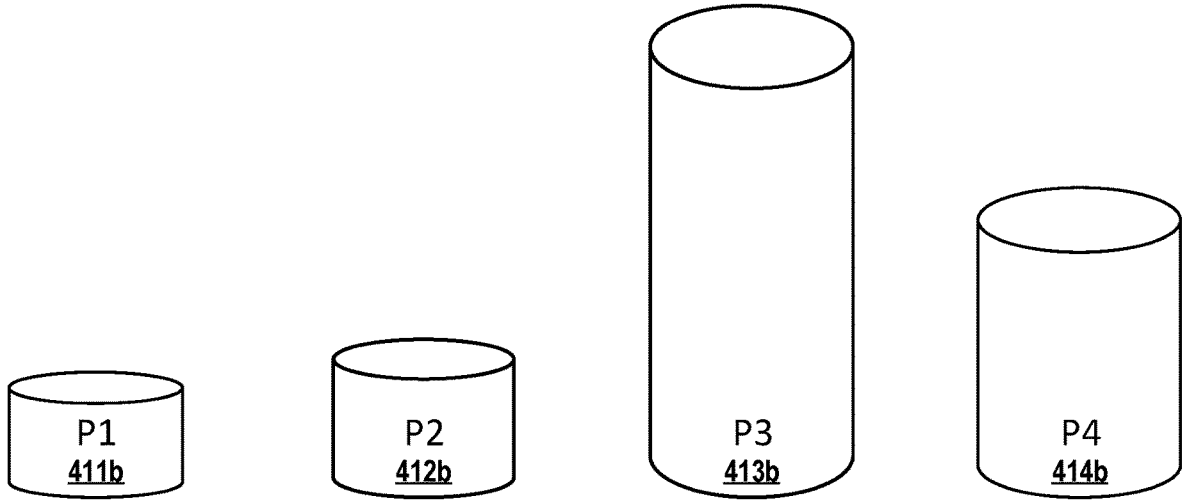

FIGS. 4A and 4B illustrate the partition-balancing problem inherent in current DBMS technology that is addressed by embodiments of the present invention. FIG. 4A shows items 400-414a and FIG. 4B shows items 411b-414b.

In FIG. 4A, a database table 400 managed by a conventional DBMS contains a column capable of storing a numeric data values ranging from 0000 through 9999. In this example, the column is a primary index or key of the table, allowing the records to be sorted, searched, and retrieved by the numeric values stored in the primary index column.

When receiving a request for records containing a particular numeric value of the index, the DBMS searches through table 400 for records that have stored that particular value in the primary index column. Initially, pointers to the table 400's records are evenly divided among four logical partitions 401a-404a, such that each logical partition 401a-404a points to records containing index values falling within one quarter of the 0000-9999 span of values. Because the records are by default sorted by index values, each logical partition 401a-404a contains, in certain embodiments, key or index values that point to a contiguous, sequentially ordered set of records.

In this simple example, records referenced by each logical partition 401a-404a are physically stored, respectively, in corresponding physical partitions P1-P4 (represented in FIG. 4A by items 411a-414a). In real-world implementations, a DBMS incorporating known technology may allocate records, pointed to by the contents of a logical partition 401a-404a, in physical storage in any manner known in the art and preferred by an implementer.

FIG. 4B represents the way in which the relative sizes of physical partitions P1-P4 (shown here as items 411b-414b) have evolved over time as the DBMS adds, deletes, and revises records in response to user requests. In this figure, the height of each physical partition 411b-414b is roughly proportional to the number of records of table 400 that are physically stored in each partition 411b-414b at this later time.

Here, physical partition P1 411b is small because table 400 at this later time contains a relatively small number of records indexed by numeric data values from 0000-2499, inclusive. But physical partition P2 411b contains a somewhat larger number of records with data values spanning 2500-4999. Physical partition P3 413b has accumulated a much larger number of records spanning 5000-7499 and physical partition P4 414b contains an intermediate number of records that contain index-column data values that span 7500-9999.

Such fluctuations in the number of records stored in each physical partition 411b-414b can create performance, efficiency, and complexity problems for current-technology DBMSs. For example, even if only a handful of records contain the index value 6500, a query that requests access to records indexed by the value 6500 would require a query-processing component of the DBMS to traverse an unnecessarily large number of records in P3 413*b*.

Similarly, a query requesting all records that contain index values within the span 2495-2500 would require physically accessing both partition P1 411*b* and P2 412*b*, even if table 400 contains only a handful of requested records. In this case, although only a small number of records must be accessed, two entire physical partitions would need to be accessed and retrieved.

FIGS. 5-8 illustrate embodiments of the present invention that improve known DBMS technology by providing a novel way to dynamically adjust the size of physical partitions and the ranges of data values contained in each logical partition and physical partition. Unlike simpler mechanisms that generally use no more than static rules of thumb to organize and store database records, embodiments of the present invention dynamically and intelligently update the structure of logical and physical partitions by drawing inferences from a DBMS's current workload and execution history, as well as from data statistics that identify the current distribution of data in the database.

Figure 5:
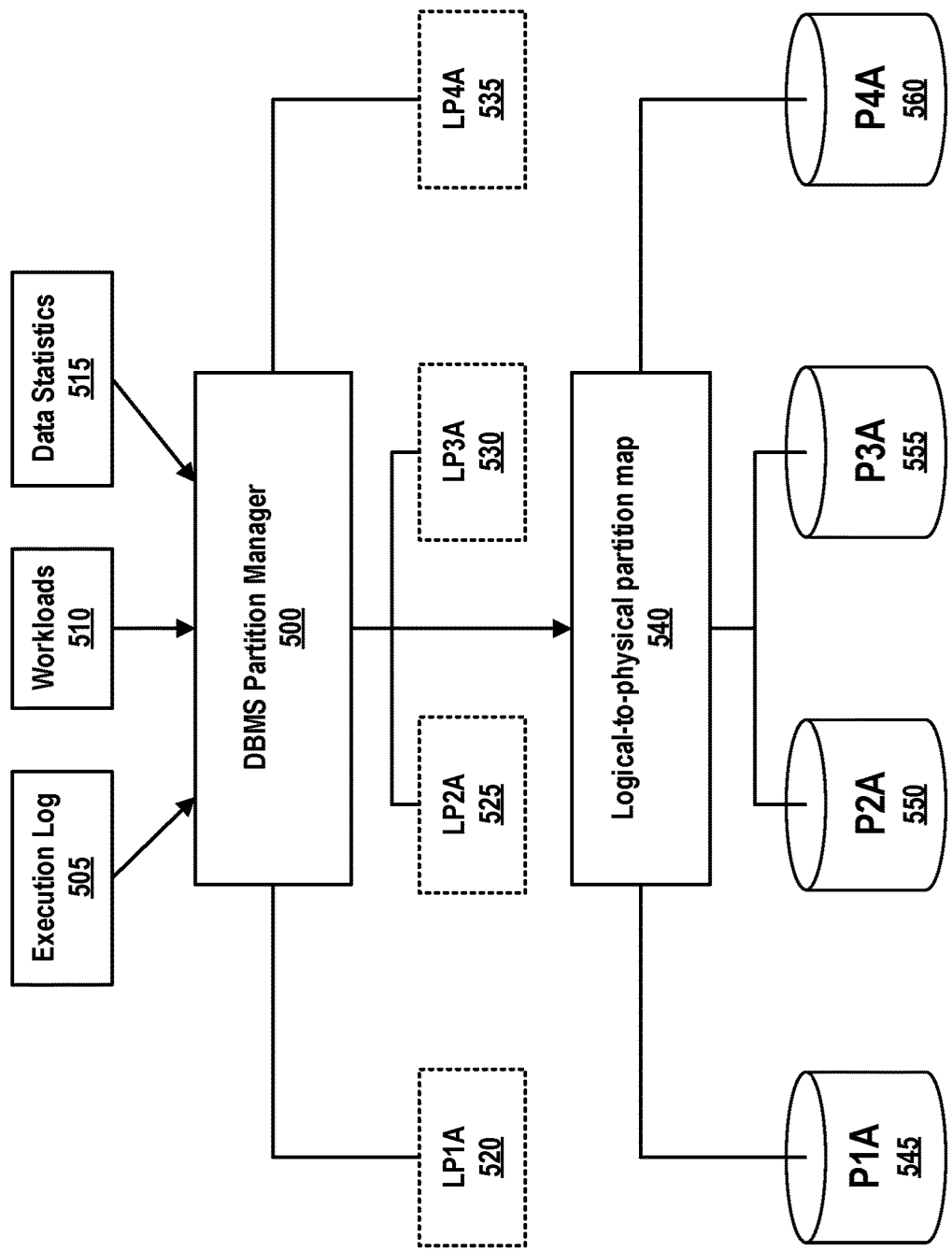
FIG. 5 shows the structure of an embodiment of the present invention that enhances a conventional DBMS architecture with an intelligent partition-manager component that manages a logical-to-physical partition map.

FIG. 5 shows the structure of an improved DBMS, in accordance with embodiments of the present invention, that enhances a conventional DBMS architecture with an intelligent partition-manager component 500 that manages a logical-to-physical partition map. FIG. 5 shows items 500-560.

Partition manager 500 draws inferences from a listing of database-access requests in the DBMS's current workload 610, from execution logs that describe the status of pending and completed database-access requests 505, and from database statistics 515 that, among other things, enumerate the number of instances of each distinct data value stored in each column of each table of a database managed by the DBMS. In some embodiments, these inferences are inferred through known methods of artificial intelligence, such as cognitive computing, expert-system, and machine-learning technologies.

Partition manager 500 uses these inferences to:

i) identify non-overlapping, distinct logical predicates (referred to in this document as "conditions"), that are each a subset of a logical predicate specified by at least one data-access request in the current workload, and that each specify a subset of all possible key values that may be stored in a corresponding index column of a database table; and ii) organize the identified conditions into pairs known as "ranges." Each range specifies two conditions culled from the same data-access request of the current workload that together reference index or key values of records stored in one or two database tables.

Partition manager 500 then allocates, to a set of logical partitions (such as the exemplary LP1A-LP4A 520-535), pointers to the database records identified by each range. Each logical partition 520-535 contains references to database records specified by both conditions of at least one of the ranges. It is thus known that the records specified by a range of a particular logical partition have been requested together at least once in the past. In some embodiments, each logical partition 520-535 contains pointers to records identified by only one of the identified ranges. In other embodiments, a logical partition 520-535 may reference records identified by multiple ranges, provided that all ranges of the multiple ranges share a common attribute related to the manner in which the ranges are accessed. In some embodiments, that attribute may be a particular frequency at which records referenced by the multiple ranges are accessed, resulting in a logical partition 520-535 containing a group of ranges that, despite the fact that the ranges of records are not in general requested concurrently, the ranges are all accessed very frequently, or are all very rarely accessed.

Partition manager 500 further draws upon the inferences to derive a logical-to-physical partition map, which maps records referenced by logical partitions 520-535 to physical partitions, such as those represented by exemplary physical partitions P1A-P4A 545-560. Unlike the logical partitions 520-535, which contain only pointers to database records, the physical partitions 545-560 store actual records on a non-transitory physical storage medium.

The physical partitions 545-560 are structured such that each physical partition is most likely to contain records that must be searched or retrieved by the same data-access request. This reduces, on average, the overall number of time that the DBMS must access non-transitory physical storage devices, such as disk drives or solid-state drives (SDDs) when servicing DBMS workloads.

As will be explained in subsequent figures, records allocated to physical partitions 545-560, may be further organized such that records that are accessed most frequently are stored together in the same physical partition 520-535, or in partitions 520-535 that may be most efficiently accessed together, such as by storing the partitions on the same physical disk drive.

The partition manager 500 or an equivalent DBMS component is also responsible for ensuring that none of the physical partitions 545-560 are allowed to shrink below a predetermined minimum size or to grow beyond a predetermined maximum size. By combining small partitions and splitting excessively large partitions, the system further reduces the number of unnecessary record retrievals or physical-partition accesses that must be performed in order to service a DBMS workload.

In certain embodiments, this combining/splitting procedure may be deployed on an ongoing basis, by continuing to retrieve and analyze lists of DBMS workloads, data statistics, and execution logs. This ongoing procedure makes it more likely that all physical partitions 545-560 remain similar in size over time.

Figure 6A:
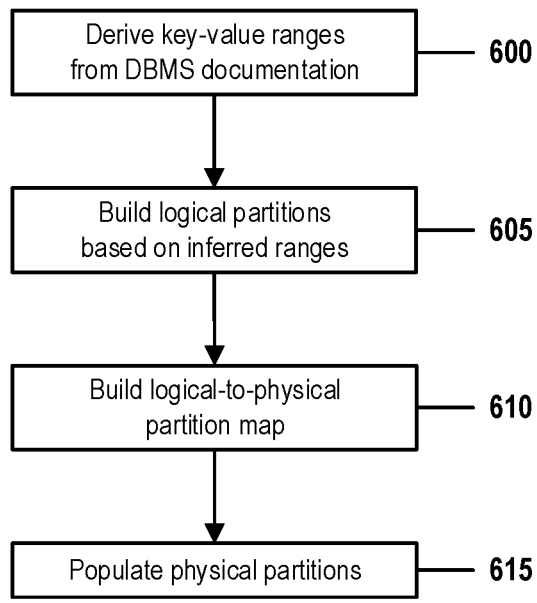
FIG. 6A is a flow chart that shows steps of a method for creating optimized database partitions in accordance with embodiments of the present invention.
Figure 6B:
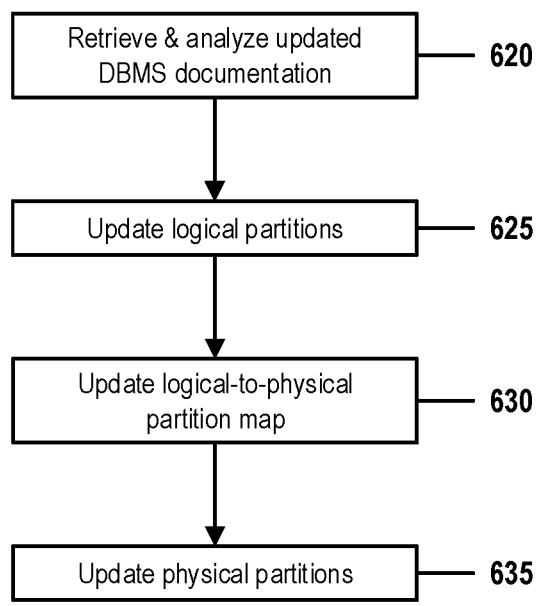
FIG. 6B is a flow chart that shows steps of a method for maintaining optimized database partitions in accordance with embodiments of the present invention.
Figure 7:
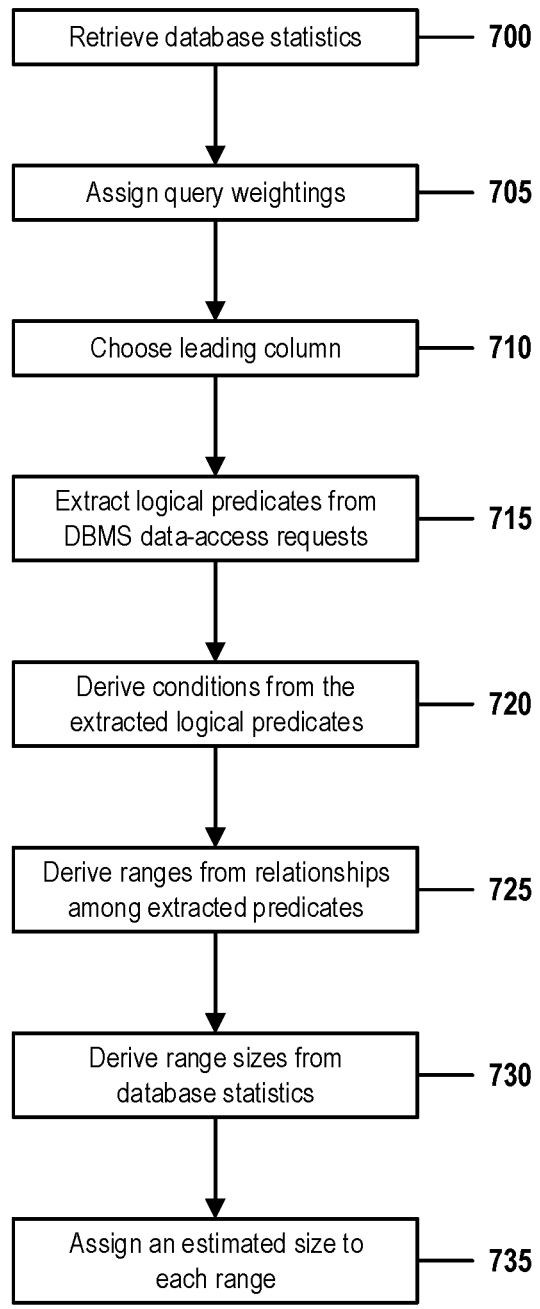
FIG. 7 is a flow chart that illustrates steps for inferring key-value ranges from a DBMS workload in accordance with embodiments of the present invention.
Figure 8:
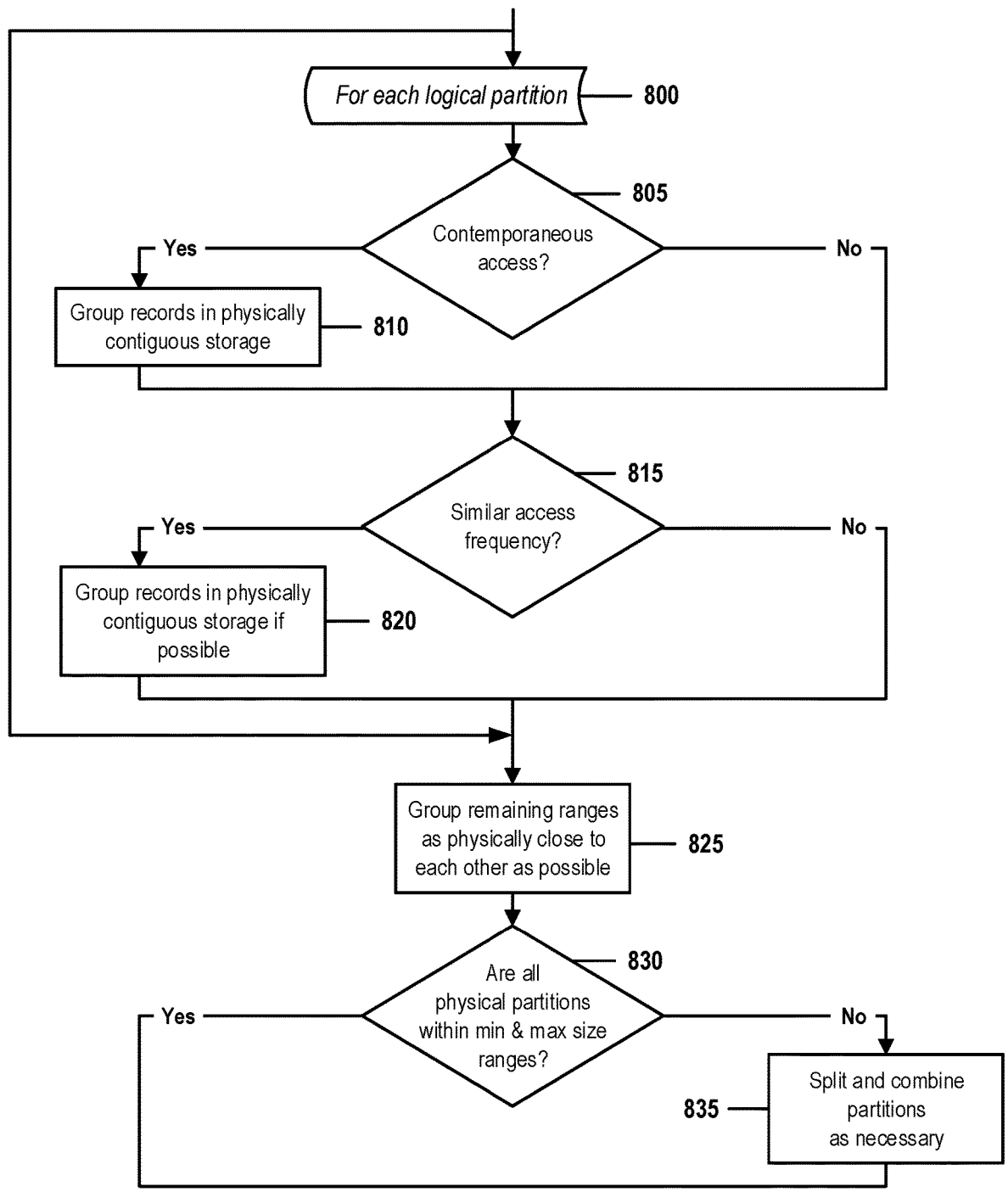
FIG. 8 is a flow chart that illustrates steps of a method for mapping logical DBMS partitions to physical DBMS partitions in accordance with embodiments of the present invention.

FIGS. 6-8 describe these procedures in greater detail.

FIG. 6A is a flow chart that shows steps of a method for creating optimized database partitions in accordance with embodiments of the present invention. FIG. 6A shows steps 600-615.

In FIG. 6A, a component of an enhanced DBMS, in accordance with embodiments of the present invention, begins a procedure for intelligently creating a set of physical partitions, such as the exemplary partitions 545-560 of FIG. 5. This component can be identical in form and function to partition manager 500 or, if preferred by an implementer, can be functionally similar to any other application or functional module of a DBMS. Regardless of implementation details, FIGS. 6A-8 will refer to this component as "partition manager 500" for purposes of brevity.

In step 600, partition manager 500 retrieves documents or information from which can be inferred characteristics of stored data accessed by current and past workloads of the DBMS. This information comprises, depending on embodiment details:

i) the DBMS's current workload, which comprises data-access requests, such as Structured Query Language (SQL) queries, that have not yet been completely serviced by the DBMS;

ii) one or more execution logs of the DBMS, which report the status of current or completed data-access requests. This status information may, for example, report that a request was successfully completed, failed, is pending, or is currently being serviced; or identify amounts of resources consumed by processing the request, error conditions generated by the request, identify times at which the request was submitted, began processing, or was completed; or similar types of information that is logged by a DBMS; and iii) data statistics that record the number of times that each possible data value is stored in a particular column of a database table.

As detailed in FIG. 7, partition manager 500 draws inferences from one or more of these documents that lead to the identification of ranges of index values. Each range comprises a pair of logical conditions, where each condition is a logical predicate that identifies a distinct, non-overlapping subset of key or index values that may be stored in a particular table column of a database managed by the DBMS. Each of these conditions specifies a subset of the values specified by at least one logical predicate expressly stated by a data-access request of the current workload 510.

In one example, an SQL query of the workload contains a predicate that identifies certain records of a table containing a column C1. Here, column C1 is capable of storing five-digit Zip Code strings ranging from "00000" through "99999." The predicate

"10704"<=C1<"10954"

thus identifies records containing data-values in column C1 from "10704" to "10954." Partition manager 500 would, by means of procedures described in FIG. 7, generate one or more conditions that identify subsets of this set of records.

Partition manager 500 groups these conditions into pairs, and two conditions are grouped into a pair if at least one data-access request of the current workload has requested access to the records referenced by both conditions in the same query. In the preceding example, if the query contains a second predicate, which specifies key values stored in a numeric column C3 of a different table of the same database:

100<C3<=399, and if partition manager 500, through the method of FIG. 7, has derived the conditions:

"10700"<=C1<"10900"

301<C3<=399 respectively, from the two subsets of key values specified by access request's two logical predicates, then the partition manager 500 would group the two conditions into a pair because both conditions are derived from logical predicates of the same query.

At the conclusion of step 600, partition manager 500 will have generated a set of key-value ranges. Each range comprises a pair of logical-predicate "conditions," that each identify database index or key values stored in a distinct database-table column. Two conditions of the same range together identify records that have been requested together by at least one data-access request of the current workload 510.

In step 605, partition manager 500 organizes the set of ranges into a corresponding set of logical partitions LP1A-LP4A 520-535. A goal of certain embodiments of the present invention is to store database records that are frequently accessed, or that are most often accessed together, in proximate locations in physical storage, such as in the same physical partition 545-560. One step in achieving this goal is to group index or key values (or other types of identifiers that point to storage locations in physical media) that reference those records by grouping those pointers in a similar manner in logical partitions LP1A-LP4A 520-535. In particular, partition manager 500 allocates to the same logical partition 520-535 pointers to records identified by a range's two sets of key values. This is accomplished as a function of inferences, drawn in step 500, that determined that records identified by the two sets of key values were in the past accessed together. In some embodiments, every key-value range is uniquely associated with exactly one logical partition LP1A-LP4A 520-535. In some embodiments, the ranges are further split to remove any overlap between ranges, prior to allocating ranges to specific logical partitions 520-535.

In step 610, partition manager 500 builds a logical-to-physical partition map 540 that specifies how database records should be distributed among the physical partitions 545-560. In some embodiments, only records identified by one or more ranges allocated to the same logical partition 520-535 are allocated to one corresponding physical partition 545-560. In other embodiments, records identified by ranges allocated to one or more logical partitions 520-535 are allocated to one corresponding physical partition 545-560.

In the latter case, partition manager 500 uses several criteria to determine how to map the ranges identified by each logical partition 545-560 onto the physical partitions 545-560. For example, partition manager 500, as a function of inferences drawn from at least one of the current workload 510, execution logs 505, and database statistics 515, groups in the same physical partition 545-560 records identified by ranges that are likely to be retrieved together. This determination may be made by any means known in the art, such as by intelligently inferring that past queries that requested certain distinct ranges were submitted to or processed by the DBMS concurrently.

Another goal of certain embodiments is to group records in physical partitions 545-560 as a function of how often the records have been accessed in the past. Again, this determination may be made as a function of inferences drawn from at least one of the current workload 510, execution logs 505, and database statistics 515. In some embodiments, an implementer may prioritize these criteria (and others identified by an implementer through known means as being likely to improve query-processing performance). For example, one embodiment may first load each physical partition 545-560 with records identified by one corresponding logical partition 545-560, thus ensuring that records likely to be requested concurrently are stored at the same location in physical storage. The partition manager 500 would then combine certain physical partitions 545-560 such that physical partitions containing the most frequently accessed ranges of records are merged into a single partition or group of partitions. Similarly, in some embodiments, partition manager 500 would also combine physical partitions 545-560 such that physical partitions containing the least frequently accessed ranges of records are merged into a single partition or group of partitions. The present invention is flexible enough to accommodate any type of partition-combining criteria preferred by an implementer.

In step 615, partition manager 500 directs a storage-management component of the DBMS to physically store the database records identified by the logical-to-physical map 540 in the physical partitions 545-560 specified by the map.

FIG. 8 describes embodiments of the method of step 610 in greater detail.

FIG. 6B is a flow chart that shows steps of a method for maintaining optimized database partitions in accordance with embodiments of the present invention. FIG. 6B shows steps 620-635.

Each step of the procedure of FIG. 6B is analogous to a corresponding step of FIG. 6A. Once the method of FIG. 6A has generated sets of key-value ranges, logical partitions 520-535, and physical partitions 545-560, the procedure of FIG. 6B repeats a subset of the FIG. 6A steps to periodically update the physical partitions 545-560. This updating is performed in order to ensure that no physical partition 545-560 exceeds a maximum predetermined size or has dropped below a predetermined minimum size. In some embodiments, the method of FIG. 6B also updates the logical partitions 520-535 in response to changes over time in the DBMS's workload, database statistics, or execution history that result in revisions to the key-value ranges derived in step 600.

In step 620, partition manager 500 repeats, at a later time, all or part of the information-retrieval procedure of step 600 and FIG. 7. Depending on implementer preferences, partition manager 500 in this step may retrieve any combination of updated versions of the DBMS workload listing, DBMS execution logs, and database data statistics that are current at the subsequent time. In certain embodiments, partition manager 500 retrieves only a listing of data-access requests in the DBMS's current workload.

Using methods analogous to those of step 600, partition manager 500 in step 620 then updates the set of conditions and the set of key-value ranges to compensate for changes in the DBMS's ongoing workload that have occurred since the initial performance of step 600.

In step 625, partition manager 500, using a procedure analogous to that of step 605, associates the revised set of ranges derived in step 600 to a revised set of logical partitions LP1A-LP4A 520-535.

In step 630, partition manager 500, using a procedure analogous to that of step 610 and FIG. 8, builds a revised logical-to-physical partition map 540 that specifies how database records identified by the revised data-value maps and revised logical partitions 545-560 should be distributed among the physical partitions 545-560.

In step 635, partition manager 500 directs a storage-management component of the DBMS to physically store the database records identified by the revised logical-to-physical map 540 in the physical partitions 545-560 specified by the revised map.

FIG. 7 is a flow chart that illustrates steps for inferring key-value ranges from a DBMS workload in accordance with embodiments of the present invention. FIG. 7 shows steps 700-730, which add detail to step 600 of FIG. 6A and step 620 of FIG. 6B.

In step 700, partition manager 500 retrieves the latest version of the DBMS's database statistics 515. Certain embodiments may omit this step if an implementer deems that the earlier statistics 515 retrieved in step 600 or 620 is still current enough to provide an accurate accounting of database contents, or if the timing of steps of the procedure of FIGS. 6A and 6B makes it sufficiently likely that the originally retrieved statistics 515 are no longer accurate by the time the method of FIG. 7 is to be performed.

In optional step 705, partition manager 500 assigns a weighting to each data-access request in a subset of the data-access requests contained in the current workload 510. These weightings may also be identified by any other criteria preferred by an implementer, within the technical constraints of the DBMS and the platform upon which the DBMS runs. In certain embodiments, for example, weightings are derived from various combinations of historical records, execution logs 505, workloads 510, database data statistics 515, and records of extrinsic events or conditions (such as correlations between the makeup of a DBMS workload and a day of the week, hour of the day, or occurrence of particular weather conditions).

In one example, each distinct data-access request is assigned a weighting proportional to the total number of times that the distinct data-access request is submitted to the DBMS during a certain period of time, or the frequency with which the request is submitted during the certain period of time. In other embodiments, a weighting is assigned to a distinct data-access request as a function of the average execution time or amount of resource consumption incurred by servicing the distinct request; or as a function of a business-defined criticality of a record or table accessed by the request, or of a purpose of the request. For example, an embodiment might increase the weight of requests made by Accounting personnel during the last week of each fiscal year, or of requests that access a database table of mission-critical engineering data. In certain embodiments, predefined threshold values or tiers may also be configured to deterministically assign an absolute weighting to each distinct data-access request.

In step 710, partition manager 500 selects a "leading column" from the columns specified by data-access requests of the current workload 510. In some embodiments, efficiency can be improved by considering only the most heavily weighted requests when making this selection. The present invention is flexible enough to accommodate any sort of criteria preferred by an implementer for determining how many of the workload requests, or what per cent of the workload requests, should be considered when selecting a leading column.

Regardless of how many requests are considered, the leading column is selected as the database column that is referenced most often by the considered requests. For example, an implementer might decide to consider the four most heavily weighted distinct queries, denoted here as query (1)-query (4). Because users can submit the same query multiple times partition manager 500 would count each instance of each distinct query. The leading column would then be selected by simply summing the number of times that each database column is referenced by any instance of the four submitted queries.

In this example, the current workload 510 and execution logs 505 reveal that queries (1)-(4) request access to database columns C1, C2, C3, and C4. Column C1 is accessed by query (1) 800 times per day, query (2) 200 times per day, query (3) 400 times per day, and query (4) 600 times per day. Column C1 is thus accessed a total of 2000 times per day by the four most heavily weighted distinct data-access requests.

Similar computations reveal that column C2 is accessed 1000 times per day, column C3 is accessed 400 times per day, and column C4 is accessed 600 times per day. Partition manager 500 would then select column C1 to be the leading column because column C1 is accessed most often by the subset of data-access requests that have been assigned the greatest weight.

In step 715, partition manager 500 extracts logical predicates from the queries or other types of data-access requests contained in the current workload 510. Each extracted logical predicate is a logical expression (ultimately evaluating to a TRUE or FALSE value) that identifies a column of a table of the database, a contiguous subset of database index or key values capable of being stored in the identified column, and one or more logical operators. For example, an SQL query:

(1) SELECT*FROM TB1 WHERE A<C1<E AND c<C2<d contains two predicates linked by an AND operator into a compound predicate. The first predicate, "A<C1<E," specifies a span of index values of a column C1, of table TB1, that fall between the value "A" and the value "E." The second predicate, "c<C2<d," specifies values of table TB1's column C2 that fall between the value "c" and the value "d."

At the conclusion of step 715, partition manager 500 will have extracted a set of these logical predicates, and will have noted which of the predicates were extracted from the same data-access request.

In step 720, partition manager 500 derives from the extracted logical predicates a set of more granular predicates by identifying relationships among the extracted predicates. This document refers to the more granular, derived predicates as "conditions," in order to distinguish the derived predicates here from the original extracted predicates.

Each condition references a subset of the index or key values stored in a column of the database. These conditions will be used by partition manager 500 in step 725 to generate key-value "ranges" that each consist of a distinct pair of the derived conditions.

In one example, workload 510 contains the four SQL queries:

(1) SELECT*FROM TB1 WHERE A<C1<E AND c<C2<d
(2) SELECT*FROM TB1 WHERE B<C1<C AND (a<C2<b OR e<C2<f)
(3) SELECT*FROM TB1 WHERE C<=C1<F AND 50<C3<100
(4) SELECT*FROM TB1 WHERE C1>G AND X<C4<Y

These four queries each specify logical predicates that impose constraints on key values of records stored in four database columns C1, C2, C3, and C4. A goal of the procedure of FIG. 7 is to identify database records that are most frequently accessed together, and one step in this process is to identify relationships and correspondences among the logical predicates extracted from the queries. For example, when partition manager 500 determines (depending on embodiment, through either analytic or cognitive means) that two extracted predicates reference overlapping sets of key values, partition manager 500 creates a set of distinct conditions that each reference a distinct, contiguous overlapping or non-overlapping subset of the key values. In this way, partition manager 500 intelligently identifies the most granular, distinct, non-intersecting sets of database records that are queried concurrently.

In the running example, this derivation begins by considering extracted predicates that reference the leading column, although in other embodiments, columns may be processed in a different order, as preferred by an implementer. Here, queries (1)-(4) specify four predicates that each identify key values of records stored in leading column C1:

A<C1<E  B<C1<C  C<=C1<F  C1>G

Although these four predicates identify overlapping key values, it is possible to express the entire set of values identified by all four extracted predicates as a combination of five non-intersecting conditions:

A<C1<=B  B<C1<C  C<=C1<E  E<=C1<F  C1>G

In other words, partition manager 500 in this step splits the (possibly non-contiguous) set of C1 key values identified by the four extracted logical predicates into a set of five contiguous, non-overlapping "conditions" that reference a more granular set of records; and where the more granular sets together duplicate the entire set of records referenced by the original four predicates.

At the conclusion of step 720, partition manager 500 will have derived a set of conditions that each reference a subset of the database records referenced by one of the extracted logical predicates. For any particular database column, each condition derived for that column identifies a set of key values that points to a contiguous, distinct, non-intersecting subset of the records referenced by an extracted logical predicate. Furthermore, the set of records referenced by any of the extracted predicates is equivalent to the set records referenced by either one of the conditions derived for key values of that column, or by a union of two or more such conditions.

In step 725, partition manager 500 combines the derived conditions into pairs. The pairs are referred to in this document as key-value "ranges." Two conditions in the same range identify two sets of key values that respectively point to two contiguous sets of database records known to have been accessed together in the past by the same data-access request.

Partition manager 500 selects conditions for each pair by identifying relationships among extracted predicates or conditions that reference records in different table columns. This procedure began in step 720, which considered extracted predicates or conditions that referenced leading column C1, which was the database column most often accessed by workload requests. In step 725, this procedure continues in a similar manner with the second-most often accessed column, then the third-most often accessed column, and so forth.

In the running example, queries (1)-(4) comprise three predicates that each impose conditions upon key values that reference records stored in the second-most often accessed column C2:

c<C2<d  a<C2<b  e<C2<f

As with C1, partition manager 500 derives a set of conditions that each reference one subset of the smallest possible collection of contiguous, non-intersecting subsets of the set of records queried concurrently by data-access requests of workload 510. In this case, because the three originally extracted C2 predicates did not intersect, the three derived C2 conditions are identical to the extracted C2 predicates:

c<C2<d  a<C2<b  e<C2<f

Once conditions have been derived for multiple columns, partition manager 500 next identifies relationships between pairs of conditions in order to organize the conditions into ranges. As mentioned above, each range consists of two conditions that respectively reference two sets of database records known to have been queried together by the same data-access request of workload 510. These relationships may be identified by any means known in the art, but in certain embodiments, the identifications of the relationships or the identifications of the pairs of conditions are performed through a known application of artificial intelligence, such as a computer program that incorporates cognitive-computing, machine-learning, online analytics, or expert-system technology.

In the running example, partition manager 500 has derived conditions for leading column C1 and the second-most often accessed column C2. Partition manager 500 can then express the set of key values identified by the compound logical predicate of query (1) as a union of three ranges. Each of these ranges consists of a distinct pair of one of the previously derived C1 conditions and one of the previously derived C2 conditions.

The original, extracted, logical predicate of query (1) references records identified by key values stored in columns C1 and C2:

A<C1<E AND c<C2<d

The two sets of records identified by this compound predicate are equivalent to the union of the three sets of records identified by three ranges that each consist of one pair of the conditions derived in step 705:

Range 1: A<C1<=B AND c<C2<d
Range 2: B<C1<C AND c<C2<d
Range 3: C<=C1<E AND c<C2<d Each of these three ranges identifies two sets of key values that in turn reference two sets of database records known to have been queried by the same data-access request. In other words, query (1) requests the DBMS to concurrently access the two sets of records identified by the two conditions of range 1; requests the DBMS to concurrently access the two sets of records identified by the two conditions of range 2; and requests the DBMS to concurrently access the two sets of records identified by the two conditions of range 3.

Extending the current example, partition manager 500 uses the same procedure to generate, from queries (1)-(4), additional conditions for remaining columns C3 and C4, producing a total of eight ranges. Like Range 1, Range 2, and Range 3 above, each of the eight derived ranges identifies key values of database records that are known to have been requested concurrently by the same workload data-access request.

The eight resulting ranges are:
(R1) A<C1<=B AND c<C2<d
(R2) B<C1<C AND c<C2<d
(R3) B<C1<C AND a<C2<b
(R4) B<C1<C AND e<C2<f
(R5) C<=C1<E AND c<C2<d
(R6) C<=C1<E AND 50<C3<100
(R7) E<=C1<F AND 50<C3<100
(R8) C1>G AND x<C4<y At the conclusion of step 725, partition manager 500 will have generated a set of ranges. Each range consists of two conditions, and each condition is a logical predicate that identifies a range of key values that references a subset of one database table's records. And all records referenced by a particular range's key values are known to have been accessed concurrently at least once by a previous data-access request of workload 510.

In step 730, partition manager 500 identifies the number of database records referenced by each range. This identification may be made by any means known in the art, such as by analyzing the documentation and logs retrieved in step 600 or 620. For example, the database data statistics retrieved in step 600, 620, or 725 identifies the total number of records that are identified by a particular value of a particular key or index. By counting the numbers of records identified for each distinct key value in a range, partition manager 500 determines how many physical, stored database records are referenced by that range. This determination will allow partition manager 500 to configure physical partitions 545-560 in step 830 of FIG. 8 such that the size of each partition falls between predetermined minimum and maximum sizes.

At the conclusion of step 730, embodiments of the present invention continue with step 605 of FIG. 6A or step 625 of FIG. 6B.

For pedagogical purposes, examples and embodiments described in FIGS. 7-8 are limited to key-value ranges that each comprise logical predicates and conditions associated solely with columns of the same database table. In other embodiments, however, the procedures of FIGS. 6A-8 are extended in a straightforward manner to accommodate key-value ranges that identify columns of two different database tables. In these latter embodiments, a logical partition 520-535, or two conditions of a single range, is allowed to specify records from different database tables only if all the specified records have in the past been accessed together by the same data-access request of workload 510.

FIG. 8 is a flow chart that illustrates steps of a method for mapping logical DBMS partitions to physical DBMS partitions in accordance with embodiments of the present invention. FIG. 8 shows steps 800-835, which add detail to step 610 of FIG. 6A and step 630 of FIG. 6B.

Step 800 begins an iterative procedure of steps 800-820, which is repeated once for each logical partition 520-535 created in step 605 of FIG. 6A or step 625 of FIG. 6B.

In step 805, partition manager 500 determines whether the records pointed to by the current logical partition 520-535 have all been accessed concurrently in the past by the same data-access request of workload 510. This determination may be made by any means known in the art, such as by referring to the list of current or previous queries enumerated in the current or subsequent workload 510 or execution logs 505.

If a logical partition 520-535 contains only one key-value range, then by definition all records referenced by the logical partition 520-535 have been in the past accessed together. But the determination of step 805 goes further in determining whether the records referenced by that partition 520-535 were in the past accessed together with records already stored in previous logical partitions 520-535 during previous iterations of the method of FIG. 8.

If either of these conditions are true, then the method of FIG. 8 continues with step 810. If not, the method continues to step 815.

In step 810, partition manager 500 retrieves the records pointed to by the range of the current logical partition 520-535 and stores them in a physical partition 545-560. If no previously stored records had been identified as having been previously accessed together with the records associated with current logical partition 520-535, then the records are stored in an empty physical partition 545-560. However, if a physical partition 545-560 exists that contains records that are determined to have previously been accessed together with records associated with the current logical partition 520-535, then those associate records are stored in the existing physical partition 545-560. In either case, at the conclusion of step 810, the records pointed to by the range of the current logical partition 520-535 will have been stored in a physical partition 545-560 that contains only records that have in the past been accessed together.

In step 815, partition manager 500 determines whether records pointed to by the current logical partition 520-535 were accessed frequently in the past. A determination that a record has been accessed frequently may be made by means of any criteria preferred by an implementer. For example, a record may be deemed to be frequently accessed if the number of queries that request access to the record exceeds a predetermined absolute number or a predetermined per cent of the number of requests submitted to the DBMS during a particular period of time.

In some embodiments, the method of FIG. 8 omits steps 815-820 if the records associated with the current logical partition 520-535 were stored in a physical partition 545-560 that already contained records. In such embodiments, records that have already been stored in proximity to each other, because the records are known to be accessed together, are not further combined with other records that, despite being frequently accessed, are not known to be accessed together.

In step 820, partition manager 500 stores the records pointed to by the current logical partition 520-535 (which have been deemed to be frequently accessed) in a physical partition 545-560 that already contains records that are also known to be frequently accessed.

In certain embodiments, some or all of these steps may be performed in a different order. For example, an implementer that considers frequency of access to be more critical to query-processing performance than is concurrent access, might perform steps 805-810 after steps 815-820, giving the former criteria greater priority when choosing the physical location of stored records. And other embodiments may add other criteria that operate in an analogous manner, grouping records in physical proximity if those records satisfy those other criteria. Examples of such criteria comprise: a degree of mission-criticality of a queried database table; an average amount of resource consumption associated with accessing the records; or a number of concurrent users that typically request access to the records at the same time.

In step 825, partition manager 500 groups the remaining records referenced by a logical partition in the same physical partition or partitions 545-560. These remaining records may comprise records that have not been accessed by any data-access request of the current or subsequent workload 510; or records that are all accessed with a frequency that falls below a predetermined threshold value. These remaining records may also include records that, despite being requested by a data-access request of an earlier workload 510, were not requested concurrently with any other set of records.

In step 830, partition manager 500 determines whether the size of each physical partition 545-560 loaded with records in the preceding steps of FIG. 8 falls within a predetermined size range. If a physical partition 545-560 is larger than a predetermined maximum size or smaller than a predetermined minimum size, the partition 545-560 is resized in step 835.

In step 835, partition manager 500 splits any physical partition 545-560 that exceeds the predetermined maximum size into two or more smaller partitions. Similarly, if any physical partitions 545-560 are found to be smaller than the predetermined minimum size, partition manager 500 combines two or more of these small partitions into one or more partitions 545-560 that fall within the predetermined size range. When combining physical partitions 545-560, partition manager 500 attempts to combine records with similar attributes into the same physical partition 545-560. These attributes, as described above, can include any criteria deemed by an implementer to facilitate the efficient processing of data-access requests.

For example, when faced with multiple options for combining physical partitions 545-560, partitions manager 500 in some embodiments would give preference to combining records accessed with similar degrees of frequency, that are all part of the same database table, or that all incur especially high or especially low overhead when accessed. The present invention is flexible enough to accommodate any such criteria preferred by an implementer.

In yet other embodiments, physical partitions 545-560 manager 500 selects which two "small" physical partitions 545-560 to merge, from a set of candidate small physical partitions 545-560s, by choosing physical partitions 545-560 associated with logical-partition ranges that share the most similar attributes; or by choosing physical partitions 545-560s that are most closely located in physical storage. For example, when deciding which pair of physical partitions 545-560s to merge, from a group of candidate physical partitions 545-560s, partition manager 500 would give preference to two physical partitions 545-560 stored on the same drive over the physical partitions 545-560s stored on different drives; and would give preference to physical partitions 545-560s stored on different drives at the same site or on the same network infrastructure, respectively, over physical partitions 545-560s stored at different sites or that are connected to different network infrastructures.

At the conclusion of steps 830 and 835, embodiments of the present invention conclude.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A database-management system (DBMS) system comprising a processor, a memory coupled to the processor, and a computer-readable hardware storage device coupled to the processor, the storage device containing program code configured to be run by the processor via the memory to implement a method for optimized database partitioning, the method comprising:

the system receiving a current workload of the DBMS, an execution log of the DBMS, and a set of data statistics,
where the current workload comprises pending requests for access to records stored in a database managed by the DBMS,
where the execution log lists results of servicing previous requests for access to records stored in the database,
where the data statistics enumerate data values stored in records of the database; the system identifying a set of conditions,
where each condition of the set of conditions is a logical predicate that specifies a contiguous set of key values capable of being stored in one column of the database, and
where the set of key values is a subset of a set of key values specified by a logical predicate of at least one access request of the current workload;

the system deriving a set of key-value ranges by correlating contents of the current workload and the execution log, where each range of the set of key-value ranges specifies two distinct conditions, of the set of conditions, specified by a same access request of the workload;

the system distributing the set of key-value ranges among a set of logical partitions;

the system building a logical-to-physical partition map as a function of a relative number of the access requests that request access to each range of the set of key-value ranges, where each physical partition of a set of physical partitions is associated with a range of numbers of access requests, and where the partition map maps ranges distributed to a first logical partition, of the set of logical partitions, to a first physical partition, of the set of physical partitions, if a number of times that access requests of the current workload request access to the ranges of the first logical partition falls within the range of numbers associated with the first physical partition; and the system physically storing, in a particular physical partition, of the set of physical partitions, database records identified by the key-value ranges of one or more logical partitions of the set of logical partitions, where the one or more logical partitions have been mapped to the particular physical partition.

2. The system of claim 1, further comprising:
the system receiving a subsequent workload of the DBMS at a time after the storing;
the system repeating the deriving, the distributing, the building, and the storing as functions of the subsequent workload; and
the system directing a storage manager component of the DBMS to split or combine partitions, of the set of physical partitions, as required to ensure that all partitions, of the set of physical partitions, are of a size that falls between a predetermined maximum size and a predetermined minimum size.

3. The system of claim 1, further comprising:
the system directing a storage manager component of the DBMS to split or combine partitions, of the set of physical partitions, as required to ensure that all physical partitions, of the set of physical partitions, are of a size that falls between a predetermined maximum size and a predetermined minimum size.

4. The system of claim 3, further comprising:
the system detecting that a size of a physical partition, of the set of physical partitions, has over time grown beyond a predetermined maximum size; and
the system splitting the physical partition into two or more smaller physical partitions that are each of a size that falls between the predetermined maximum size and a predetermined minimum size.

5. The system of claim 3, further comprising:
the system detecting that sizes of two or more physical partitions, of the set of physical partitions, have shrunk below a predetermined minimum size; and
the system in response combining the two or more physical partitions into a single physical partition of a size that falls between a predetermined maximum size and the predetermined minimum size.

6. The system of claim 1, further comprising:
the system assigning each access request of the current workload a relative weighting,
where the relative weighting of a distinct request of the current workload is proportional to a relative number of instances, of the distinct request, contained in the current workload.

7. The system of claim 1, where the deriving further comprises:
identifying that a first access request of the current workload comprises a first logical predicate and a second logical predicate;
identifying that a second access request of the current workload comprises a third logical predicate and a fourth logical predicate;

identifying that the first logical predicate and the third logical predicate specify contiguous sets of key values, of a same column, that overlap throughout a common subrange of the key values;
deriving a first range of the set of key-value ranges comprising: i) a first condition that specifies the common subrange, and ii) a second condition that specifies the second logical predicate; and
deriving a second range of the set of key-value ranges comprising: i) the first condition, and ii) a third condition that specifies the fourth logical predicate.

8. The system of claim 1,
where the deriving further comprises choosing a leading column, and
where the leading column is a column of the database referenced most often by the set of conditions.

9. A method for optimized database partitioning, the method comprising:
a database-management system (DBMS) comprising a processor, a memory coupled to the processor, and a computer-readable hardware storage device coupled to the processor, the storage device containing program code configured to be run by the processor via the memory to implement the method for optimized database partitioning, the method comprising:
the system receiving a current workload of the DBMS, an execution log of the DBMS, and a set of data statistics,
where the current workload comprises pending requests for access to records stored in a database managed by the DBMS,
where the execution log lists results of servicing previous requests for access to records stored in the database,
where the data statistics enumerate data values stored in records of the database; the system identifying a set of conditions,
where each condition of the set of conditions is a logical predicate that specifies a contiguous set of key values capable of being stored in one column of the database, and
where the set of key values is a subset of a set of key values specified by a logical predicate of at least one access request of the current workload;
the system deriving a set of key-value ranges by correlating contents of the current workload and the execution log, where each range of the set of key-value ranges specifies two distinct conditions, of the set of conditions, specified by a same access request of the workload;
the system distributing the set of key-value ranges among a set of logical partitions;
the system building a logical-to-physical partition map as a function of a relative number of the access requests that request access to each range of the set of key-value ranges,
where each physical partition of a set of physical partitions is associated with a range of numbers of access requests, and
where the partition map maps ranges distributed to a first logical partition, of the set of logical partitions, to a first physical partition, of the set of physical partitions, if a number of times that access requests of the current workload request access to the ranges of the first logical partition falls within the range of numbers associated with the first physical partition; and the system physically storing, in a particular physical partition, of the set of physical partitions, database records identified by the key-value ranges of one or more logical partitions of the set of logical partitions, where the one or more logical partitions have been mapped to the particular physical partition.

10. The method of claim 9, further comprising:
the system directing a storage manager component of the DBMS to split or combine partitions, of the set of physical partitions, as required to ensure that all physical partitions, of the set of physical partitions, are of a size that falls between a predetermined maximum size and a predetermined minimum size.

11. The method of claim 9, further comprising:
the system receiving a subsequent workload of the DBMS at a time after the storing;
the system repeating the deriving, the distributing, the building, and the storing as functions of the subsequent workload; and
the system directing a storage manager component of the DBMS to split or combine partitions, of the set of physical partitions, as required to ensure that all partitions, of the set of physical partitions, are of a size that falls between a predetermined maximum size and a predetermined minimum size.

12. The method of claim 9, further comprising:
the system assigning each access request of the current workload a relative weighting,
where the relative weighting of a distinct request of the current workload is proportional to a relative number of instances, of the distinct request, contained in the current workload.

13. The method of claim 9, where the deriving further comprises:
identifying that a first access request of the current workload comprises a first logical predicate and a second logical predicate;
identifying that a second access request of the current workload comprises a third logical predicate and a fourth logical predicate;
identifying that the first logical predicate and the third logical predicate specify contiguous sets of key values, of a same column, that overlap throughout a common subrange of the key values;
deriving a first range of the set of key-value ranges comprising: i) a first condition that specifies the common subrange, and ii) a second condition that specifies the second logical predicate; and
deriving a second range of the set of key-value ranges comprising: i) the first condition, and ii) a third condition that specifies the fourth logical predicate.

14. The method of claim 9,
where the deriving further comprises choosing a leading column, and
where the leading column is a column of the database referenced most often by the set of conditions.

15. The method of claim 9, further comprising providing at least one support service for at least one of creating, integrating, hosting, maintaining, and deploying computer-readable program code in the computer system, wherein the computer-readable program code in combination with the computer system is configured to implement the receiving, the repeating the deriving, the distributing, the building, and the storing.

16. A computer program product, comprising a computer-readable hardware storage device having a computer-readable program code stored therein, the program code configured to be executed by a database-management system (DBMS) comprising a processor, a memory coupled to the processor, and a computer-readable hardware storage device coupled to the processor, the storage device containing program code configured to be run by the processor via the memory to implement a method for optimized database partitioning, the method comprising:
the system receiving a current workload of the DBMS, an execution log of the DBMS, and a set of data statistics,
where the current workload comprises pending requests for access to records stored in a database managed by the DBMS,
where the execution log lists results of servicing previous requests for access to records stored in the database,
where the data statistics enumerate data values stored in records of the database;
the system identifying a set of conditions,
where each condition of the set of conditions is a logical predicate that specifies a contiguous set of key values capable of being stored in one column of the database, and
where the set of key values is a subset of a set of key values specified by a logical predicate of at least one access request of the current workload;
the system deriving a set of key-value ranges by correlating contents of the current workload and the execution log, where each range of the set of key-value ranges specifies two distinct conditions, of the set of conditions, specified by a same access request of the workload;
the system distributing the set of key-value ranges among a set of logical partitions;
the system building a logical-to-physical partition map as a function of a relative number of the access requests that request access to each range of the set of key-value ranges,
where each physical partition of a set of physical partitions is associated with a range of numbers of access requests, and
where the partition map maps ranges distributed to a first logical partition, of the set of logical partitions, to a first physical partition, of the set of physical partitions, if a number of times that access requests of the current workload request access to the ranges of the first logical partition falls within the range of numbers associated with the first physical partition;
the system physically storing, in a particular physical partition, of the set of physical partitions, database records identified by the key-value ranges of one or more logical partitions of the set of logical partitions, where the one or more logical partitions have been mapped to the particular physical partition; and
the system directing a storage manager component of the DBMS to split or combine partitions, of the set of physical partitions, as required to ensure that all physical partitions, of the set of physical partitions, are of a size that falls between a predetermined maximum size and a predetermined minimum size.

17. The computer program product of claim 16, further comprising:
the system receiving a subsequent workload of the DBMS at a time after the storing;
the system repeating the deriving, the distributing, the building, the storing, and the directing as functions of the subsequent workload; and the system directing a storage manager component of the DBMS to split or combine partitions, of the set of physical partitions, as required to ensure that all partitions, of the set of physical partitions, are of a size that falls between a predetermined maximum size and a predetermined minimum size.

18. The computer program product of claim 16, further comprising:

the system assigning each access request of the current workload a relative weighting, where the relative weighting of a distinct request of the current workload is proportional to a relative number of instances, of the distinct request, contained in the current workload.

19. The computer program product of claim 16, where the deriving further comprises:

identifying that a first access request of the current workload comprises a first logical predicate and a second logical predicate;

identifying that a second access request of the current workload comprises a third logical predicate and a fourth logical predicate;

identifying that the first logical predicate and the third logical predicate specify contiguous sets of key values, of a same column, that overlap throughout a common subrange of the key values;

deriving a first range of the set of key-value ranges comprising: i) a first condition that specifies the common subrange, and ii) a second condition that specifies the second logical predicate; and deriving a second range of the set of key-value ranges comprising: i) the first condition, and ii) a third condition that specifies the fourth logical predicate.

20. The computer program product of claim 16, where the deriving further comprises choosing a leading column, and where the leading column is a column of the database referenced most often by the set of conditions.

\* \* \* \* \*